(12) United States Patent
König et al.

(10) Patent No.: US 12,467,436 B2
(45) Date of Patent: Nov. 11, 2025

(54) OPERATIONALLY RELIABLE BEARING ASSEMBLY FOR A PITCH TUBE OF A WIND TURBINE

(71) Applicant: Flender GmbH, Bocholt (DE)

(72) Inventors: Christian König, Bocholt (DE); Lars Van Acken, Bocholt (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 19/109,471

(22) PCT Filed: Sep. 4, 2023

(86) PCT No.: PCT/EP2023/074121
§ 371 (c)(1),
(2) Date: Mar. 6, 2025

(87) PCT Pub. No.: WO2024/068186
PCT Pub. Date: Apr. 4, 2024

(65) Prior Publication Data
US 2025/0264090 A1    Aug. 21, 2025

(30) Foreign Application Priority Data
Sep. 27, 2022   (EP) .................................. 22197927

(51) Int. Cl.
*F03D 80/70* (2016.01)
*F03D 80/80* (2016.01)

(52) U.S. Cl.
CPC .......... *F03D 80/703* (2023.08); *F03D 80/85* (2016.05); *F05B 2240/50* (2013.01)

(58) Field of Classification Search
CPC ..... F03D 80/703; F03D 80/80; F05B 2240/50
See application file for complete search history.

(56) References Cited

U.S. PATENT DOCUMENTS

| 2017/0030335 | A1* | 2/2017 | Deicke | .................... F03D 15/10 |
| 2022/0333580 | A1* | 10/2022 | De Laet | .................... H02G 3/22 |
| 2022/0341398 | A1* | 10/2022 | Strasser | .................. F03D 15/00 |

FOREIGN PATENT DOCUMENTS

| CN | 102032113 A | 4/2011 |
| CN | 112576452 A | 3/2021 |

(Continued)

OTHER PUBLICATIONS

International Search Report issued by the European Patent Office on Oct. 31, 2023 in International Application PCT/EP2023/074121.

(Continued)

*Primary Examiner* — Sean Gugger
(74) *Attorney, Agent, or Firm* — Henry M. Feiereisen LLC

(57) ABSTRACT

A bearing assembly for a pitch tube of a wind power plant includes a transmission shaft, a bearing cartridge for mounting and sealing the pitch tube with respect to the transmission shaft, a fastening flange which is configured by the transmission shaft or by the pitch tube for fastening the bearing cartridge in a non-rotational manner, and an insulation element which is fastened via a first fastening element to the fastening flange and via a second fastening element to the bearing cartridge for the electrical insulation of the pitch tube with respect to the transmission shaft. With the aid of the bearing cartridge which is fastened in an electrically insulating manner by the insulation element, a mechanically and electrically operationally reliable passage of the pitch tube through the transmission of a wind power plant is made possible in an inexpensive and simple manner.

18 Claims, 2 Drawing Sheets

(56) References Cited

FOREIGN PATENT DOCUMENTS

| | | |
|---|---|---|
| EP | 2 933 483 | 10/2015 |
| EP | 3 795 825 | 3/2021 |
| EP | 3 795 861 | 3/2021 |
| EP | 3 795 862 | 3/2021 |
| GB | 201020829 | 6/2012 |
| WO | WO 2021/083466 A1 | 5/2021 |

OTHER PUBLICATIONS

Chinese Search Report issued by the Chinese Patent Office on Jun. 23, 2025 in Chinese Patent Application No. 202380066285.6.
Translation of Chinese Search Report issued by the Chinese Patent Office on Jun. 23, 2025 in Chinese Patent Application No. 202380066285.6.

* cited by examiner

OPERATIONALLY RELIABLE BEARING ASSEMBLY FOR A PITCH TUBE OF A WIND TURBINE

CROSS-REFERENCES TO RELATED APPLICATIONS

This application is the U.S. National Stage of International Application No. PCT/EP2023/074121, filed Sep. 4, 2023, which designated the United States and has been published as International Publication No. WO 2024/068186 A1 and which claims the priority of European Patent Application, Serial No. 22197927.1, filed Sep. 27, 2022, pursuant to 35 U.S.C. 119 (a)-(d).

BACKGROUND OF THE INVENTION

The invention relates to a bearing assembly for a pitch tube of a wind power plant, with the aid of which the pitch tube can be mounted and guided through in a transmission of the wind power plant. The invention relates to a drive train with a bearing assembly of this type, to a wind power plant with a bearing assembly of this type, and to a data agglomerate for virtually modeling a bearing assembly of this type for the purpose of additive manufacturing and/or simulation.

In order for it to be possible for a blade angle setting control operation (pitch control operation) to be performed in the case of wind power plants, electric and/or hydraulic lines are required which run between the rotor and a generator-side connector. A tube which is called a pitch tube and can extend from a generator as far as the rotor serves to receive these lines. In particular, the rotor and the generator are arranged coaxially with respect to one another, with the result that the pitch tube is guided through a transmission, connected between the rotor and the generator, over the entire axial extent of the transmission, in particular coaxially with respect to the transmission.

EP 3 795 825 A1 has disclosed fixing a pitch tube via a fixing means, produced from an electrical insulator, to a planetary carrier of a planetary transmission of a wind power plant, the fixing means being fastened both to the pitch tube and to the planetary carrier.

EP 3 795 861 A1 has disclosed mounting a pitch tube via a bearing which is provided outside a transmission housing, in order to discharge stray currents, generated in the generator, via the bearing.

EP 3 795 862 A1 has disclosed fixing a pitch tube with the aid of a fixing means in a transmission of a wind power plant, an electrically insulating insulation layer being provided between the fixing means and the pitch tube.

EP 2 933 483 A1 has disclosed a wind power plant, in the case of which a generator shaft of a generator is connected to an output shaft of a transmission via an electrical insulation provided between flange surfaces.

There is a constant need for the leadthrough of a pitch tube through a transmission of a wind power plant in a manner which is as operationally reliable as possible.

It is the object of the invention to specify measures which make an operationally reliable leadthrough of a pitch tube through a transmission of a wind power plant possible.

SUMMARY OF THE INVENTION

The object is achieved by way of a bearing assembly as set forth hereinafter, a drive train as set forth hereinafter, a wind power plant as set forth hereinafter, and a data agglomerate as set forth hereinafter. Preferred refinements are specified in the subclaims and the following description, which refinements can in each case individually or in combination represent one aspect of the invention. If a feature is described in combination with another feature, this serves merely for the simplified summary of the invention and is in no way intended to mean that this feature cannot also be a development of the invention without the other feature.

One aspect of the invention relates to a bearing assembly for a pitch tube of a wind power plant, with a transmission shaft, in particular a transmission output shaft for the introduction of a torque, converted in a transmission, into a generator, a bearing cartridge for mounting and sealing the pitch tube with respect to the transmission shaft, a fastening flange which is configured by the transmission shaft or by the pitch tube for fastening the bearing cartridge in a non-rotational manner, and an insulation element which is fastened via a first fastening element to the fastening flange and via a second fastening element to the bearing cartridge for the electrical insulation of the pitch tube with respect to the transmission shaft.

A relative rotation of the transmission shaft relative to the pitch tube is produced by way of the mounting function of the bearing cartridge. The pitch tube can be coupled in a non-rotational manner, for example, to a rotor of the wind power plant or to a rotor of an electric machine which configures the generator, with the result that a bearing system which is otherwise to be provided on one of the rotors can be replaced by an inexpensive frictionally locking and/or positively locking coupling or mechanical connection. The bearing system which is saved on one of the rotors can be moved into the vicinity of a seal between the pitch tube and the transmission and can be combined in the bearing cartridge. This leads to an inexpensive component integration of the functions of mounting and sealing into a common structural unit which, in particular, can be preassembled in the form of the bearing cartridge. Instead of fixing the pitch tube firmly to a rotating part of the transmission for conjoint rotation, a relative movement and possibly also a relative displacement in the axial direction of the pitch tube with respect to the transmission or the transmission shaft is deliberately produced with the aid of the bearing cartridge, which relative rotation can lead to a cost saving on account of the component integration with the sealing means of the pitch tube with respect to the transmission.

It is fundamentally also possible that the pitch tube is configured such that it cannot be rotated, in particular such that it cannot be moved. For mounting purposes, in particular, an axial relative movement of the pitch tube relative to the transmission and/or relative to the transmission shaft can be permitted, the pitch tube in the final mounting position, in which the pitch tube which is fixed in the circumferential direction is coupled to the rotor of the wind power plant and the generator. For example, the pitch tube can be fastened to a generator housing of the generator in a non-rotational manner, with the result that a bearing system relative to the rotor of the generator can be saved. As a result of the non-rotatable pitch tube, a cable guide within the pitch tube through the transmission is simplified and is particularly operationally reliable.

The bearing cartridge is configured as a structural unit which is separate from the pitch tube and from the transmission shaft, in particular can be preassembled, and is fastened either to the transmission shaft or to the pitch tube via the fastening flange. The fastening of the bearing cartridge by way of the fastening flange makes a particularly simple and inexpensive electrical insulation of the pitch tube with respect to the transmission possible, by the fastening flange being fastened with the aid of the at least one first fastening element to the insulation element, and the insulation element in turn being fastened via the at least one second fastening element to the bearing cartridge. In the component chain of fastening flange, first fastening element, insulation element, second fastening element and bearing cartridge, a sufficiently effective dielectric is provided by way of the insulation element between the first fastening element and the second fastening element, such that a voltage flashover can be avoided reliably in regular operation of the wind power plant even at the narrowest location between electrically conducting components of the bearing arrangement, which as a rule are the ends of the first fastening element and the second fastening element which point toward one another. A mechanically and electrically more operationally reliable leadthrough of the pitch tube through the transmission of a wind power plant is made possible with the aid of the bearing cartridge which is fastened via the insulation element in an electrically insulating manner.

If the fastening flange is configured, in particular in one piece, by the transmission shaft, the bearing cartridge is connected fixedly to the transmission shaft for conjoint rotation and brings about mounting and sealing of the pitch tube which can be rotated relative to the transmission shaft and to the bearing cartridge. The bearing cartridge can be configured so as to corotate with the transmission shaft. If the fastening flange is configured, in particular in one piece, by the pitch tube, the bearing cartridge is connected fixedly to the pitch tube for conjoint rotation and brings about mounting and sealing of the transmission shaft which can be rotated relative to the pitch tube and to the bearing cartridge. The bearing cartridge can be connected to the pitch tube so as to corotate. In the following text, the invention will be explained by way of example using the example of a fastening flange which is configured by the transmission shaft; the following explanations are intended to apply mutatis mutandis to the kinematic reversal of a fastening flange which is configured by the pitch tube.

The transmission shaft is, in particular, a transmission output shaft for introducing a torque, converted in a transmission, into a generator. In addition or as an alternative, the transmission shaft can also be a transmission input shaft for introducing a torque, coming from a rotor of the wind power plant, into the transmission. The transmission shaft is, in particular, configured as a hollow shaft which extends over its entire axial extent. A sun gear of a planetary stage of the transmission is preferably fastened to the transmission shaft in a torque-transmitting manner, with the result that the transmission shaft can at the same time be a sun shaft of the planetary stage.

The insulation element can be produced from an electrically non-conductive material, for example a polymeric insulator, for example a thermoplastic. Currents induced in the pitch tube by the generator and/or stray or leakage currents of the generator cannot pass into the transmission as a result and cause damage there. The insulation element can be produced from a comparatively hard dielectric insulation material. This makes it possible for the bearing forces which occur on the bearing cartridge to be capable of being supported on the fastening flange via the insulation element. The insulation element can have a disk-like region which can bear on one axial side flatly against the fastening flange and can be fastened with the aid of the at least one fastening element. The bearing cartridge can bear flatly on the axial side which points away from the fastening flange and/or on one of its shell surfaces which point in the radial direction, and can be fastened with the aid of the at least one second fastening element.

The first fastening element and/or the second fastening element can be configured, for example, as a screw connection and/or riveted connection. For example, the insulation element can have an internal thread for the respective first fastening element and/or for the respective second fastening element, for screwing in a screw. It is also possible that the insulation element has a through opening for the respective fastening element, and the respective fastening element clamps the insulation element between the head, for example a screw head or a swage head, and a counterelement, for example a threaded nut or a closing head. Here, in particular, the counterelement or the head of the respective fastening element is positioned in a countersunk manner in the insulation element, in particular an account of a relatively small material thickness of the insulation element. As a result, in the case of a low installation space requirement, the spacing between the first fastening element and the second fastening element can be configured to be great enough to ensure desired protection against a voltage flashover.

In particular, the first fastening element is spaced apart from the second fastening element and from the bearing cartridge to such an extent that the first fastening element is insulated electrically with respect to the pitch tube by the insulation element, and the second fastening element is spaced apart from the fastening flange to such an extent that the second fastening element is insulated electrically with respect to the transmission shaft by the insulation element. The first fastening element is spaced apart from the bearing cartridge in an electrically insulating manner via the material of the insulation element. In addition, the second fastening element is spaced apart from the pitch tube in an electrically insulating manner via the material of the insulation element. The first fastening element and the second fastening element are likewise spaced apart from one another in an electrically insulating manner via the material of the insulation element. A direct connection of the first fastening element to the bearing cartridge and a direct connection of the second fastening element to the pitch tube are avoided, a direct contact between the first fastening element and the second fastening element also being avoided. As a result, sufficient electrical insulation of the pitch tube with respect to the transmission shaft and the remaining transmission can be ensured.

The first fastening element and the second fastening element are preferably spaced apart from one another in the axial direction in such a way that, as viewed in the tangential direction, there is a non-overlapping offset between the first fastening element and the second fastening element. The axial offset between the first fastening element and the second fastening element can already provide a sufficient electrical insulation on its own or in combination with further specifications in respect of the relative positioning of the at least one fastening element relative to the at least one second fastening element, which electrical insulation can be realized in a particularly space-saving manner by way of further suitable specifications in respect of the relative positioning.

The first fastening element and the second fastening element are particularly preferably spaced apart from one another in the radial direction in such a way that, as viewed in the axial direction, there is a non-overlapping offset between the first fastening element and the second fastening element. The radial offset between the first fastening element and the second fastening element can already provide a sufficient electrical insulation on its own or in combination with further specifications in respect of the relative positioning of the at least one fastening element relative to the at least one second fastening element, which electrical insulation can be realized in a particularly space-saving manner by way of further suitable specifications in respect of the relative positioning.

In particular, the first fastening element and the second fastening element are spaced apart from one another in the circumferential direction in such a way that, as viewed in the radial direction, there is a non-overlapping offset between the first fastening element and the second fastening element. The circumferential angular offset between the first fastening element and the second fastening element can already provide a sufficient electrical insulation on its own or in combination with further specifications in respect of the relative positioning of the at least one fastening element relative to the at least one second fastening element, which electrical insulation can be realized in a particularly space-saving manner by way of further suitable specifications in respect of the relative positioning.

The bearing cartridge preferably has a first cartridge part for supporting a bearing, in particular an anti-friction bearing, in a first axial direction, and a second cartridge part, which is connected to the first cartridge part, for supporting the bearing in a second axial direction which is opposed to the first axial direction, the first cartridge part preferably having a seal, preferably a contactless or contact seal, in particular a radial shaft sealing ring, a gap seal and/or a labyrinth seal, and/or the insulation element further preferably bearing flatly at least against the second cartridge part. The first cartridge part and the second cartridge part can axially fix and/or axially clamp in, in particular, an outer ring or an inner ring of the anti-friction bearing which is configured, for example, as a locating bearing or floating bearing. Here, the first cartridge part can at the same time receive the seal or form the latter. The first cartridge part can have, in particular, a clearance fit which is so small with the component to be sealed, that is to say the pitch tube or the transmission shaft, that there is a sealing action against lubricating grease and/or lubricating oil and a contactless seal, in particular a gap seal, is configured. The first cartridge part preferably has a hub which has a plurality of grooves, with the result that the first cartridge part can form a labyrinth seal. It is also possible, however, for a seal of separate configuration, for example a radial shaft sealing ring, to be connected to the first cartridge part, in particular for it to be possible for it to configure a contact seal. The first cartridge part and the second cartridge part can be connected to one another with the aid of the second fastening element which is provided in any case. In addition or as an alternative, the first cartridge part and the second cartridge part can be connected to one another with the aid of at least one third fastening element which is configured separately from the first fastening element and from the second fastening element. The second cartridge part can have, in particular, an insertion bevel, in order for it to be possible for the second cartridge part and the insulation element to be plugged into one another by way of an axial relative movement. A plug-in-depth can be predetermined in a defined manner by way of the flat contact. The insulation element particularly preferably bears flatly both against the first cartridge part and against the second cartridge part.

It is particularly preferably provided that the insulation element configures a contactless seal, in particular a gap seal or a labyrinth seal, with respect to a shell surface which can be rotated relative to the bearing cartridge. As a result, the insulation element can additionally fulfill the function of a contactless seal. In particular, the first cartridge part can seal on the one axial side of the bearing, while the insulation element seals on the other axial side of the bearing, possibly assisted by a sealing action of the second cartridge part. As a result, in particular, a lubricant for lubricating the bearing can be retained in the bearing.

It is provided, in particular, that the insulation element seals an axial side of a/the bearing of the bearing cartridge. The insulation element, in particular only the insulation element on its own, can retain lubricant for lubricating the bearing in the bearing on one axial side of the bearing.

The bearing cartridge is preferably configured to support radial forces between the pitch tube and the transmission shaft. It can be taken into consideration here that the pitch tube can sag or deflect in the radial direction on account of its particularly long axial length, on account of its own weight and/or bending moments which are induced by the rotor of the wind power plant and/or by the rotor of the generator. This is boosted, in particular, by the fact that the drive train which is assembled from the rotor, the transmission and the generator can run in an angled manner with respect to the horizontal, for example by approximately 5°. The bearing cartridge cannot only mount and seal the pitch tube, but rather can also support it in the radial direction and possibly additionally in the axial direction, as a result of which a deflection of the pitch tube over a great axial distance is avoided and the pitch tube is stiffened. The mechanical loading of the pitch tube can be reduced as a result, and the operational reliability can be improved further.

The first fastening element and the second fastening element are particularly preferably oriented in the axial direction, the first fastening element and the second fastening element being covered completely, as viewed in the radial direction, by the pitch tube and/or by the transmission shaft. The bearing cartridge and the fastening of the bearing cartridge with the aid of the first fastening element and the second fastening element can be provided as a result in a manner which is recessed in the interior of the transmission shaft and preferably in the interior of a transmission housing of the transmission. There is accessibility to the first fastening element and the second fastening element via an annular space which is configured between the pitch tube and the transmission shaft, with the result that a tool can be introduced into the annular space at one axial end of the transmission shaft, in order to bring about the fastening of the bearing cartridge. The bearing cartridge is installed in a manner which is protected against environmental influences as a result.

In particular, a/the bearing of the bearing cartridge is lubricated with lubricating grease and/or lubricating oil. As a result of the sealing function of the bearing cartridge, a penetration of dust, liquid or other contaminants into the bearing can be avoided, it being possible at the same time for a discharge of lubricant in the form of lubricating grease and/or lubricating oil from the bearing to be avoided. As a result of the lubrication of the bearing, the durability of the bearing can be improved and the probability of failure can be reduced.

The pitch tube, the bearing cartridge, the fastening flange and the transmission shaft are preferably produced from an electrically conductive material, in particular steel. The production costs can be kept low as a result. At the same time, there is sufficient electrical insulation between the pitch tube and the transmission by way of the insulation element, such that the use of electrically conductive materials does not lead to disadvantages.

A further aspect of the invention relates to a drive train for a wind power plant with a rotor shaft which can be connected to a wind power-driven rotor, a motor shaft of an electric machine which can be operated in generator mode, a transmission which connects the rotor shaft to the motor shaft in a torque-transmitting manner for the conversion of a torque and a rotational speed, and a pitch tube which penetrates the transmission in the axial direction, the pitch tube being mounted in the transmission in an electrically insulated manner by at least one bearing assembly which can be configured and developed as described above. The drive train can be configured and developed, in particular, as described above. A mechanically and electrically more operationally reliable leadthrough of the pitch tube through the transmission of the wind power plant is made possible in an inexpensive and simple manner with the aid of the bearing cartridge which is fastened in an electrically insulating manner via the insulation element. A bearing assembly is preferably provided in each case both on an axial side of the transmission which points toward the rotor and on an axial side of the transmission which points toward the generator. As a result, the one bearing assembly can interact with the input shaft of the transmission and the pitch tube, the input shaft of the transmission coinciding, in particular, with the rotor shaft or being connected to the rotor shaft, while the other bearing assembly interacts with the output shaft of the transmission and the pitch tube, the output shaft of the transmission coinciding, in particular, with the motor shaft or being connected to the motor shaft.

A further aspect of the invention relates to a wind power plant for generating electrical power from wind energy, with a rotor for providing a torque from wind energy, a transmission which is coupled to the rotor for the conversion of the torque, and a generator for generating electrical power from the torque which is introduced by the transmission, the rotor, the transmission and the generator being arranged coaxially with respect to one another, and a pitch tube leading from the generator through the transmission as far as the rotor, the pitch tube being mounted in the transmission in an electrically insulated manner by at least one bearing assembly which can be configured and developed as described above. The wind power plant can be configured and developed, in particular, as described above. A mechanically and electrically more operationally reliable leadthrough of the pitch tube through the transmission of the wind power plant is made possible in an inexpensive and simple manner with the aid of the bearing cartridge which is fastened in an electrically insulating manner via the insulation element. A bearing assembly is preferably provided in each case both on an axial side of the transmission which points toward the rotor and on an axial side of the transmission which points toward the generator. As a result, the one bearing assembly can interact with the input shaft of the transmission and the pitch tube, the input shaft of the transmission coinciding, in particular, with the rotor shaft or being connected to the rotor shaft, while the other bearing assembly interacts with the output shaft of the transmission and the pitch tube, the output shaft of the transmission coinciding, in particular, with the motor shaft or being connected to the motor shaft.

A further aspect of the invention relates to a data agglomerate with data packets combined in a common file or distributed over different files for modeling the three-dimensional design and/or the interactions of all the constituent parts which are provided in the bearing assembly which can be configured and developed as described above, the data packets being prepared during processing by way of a data processing device to carry out additive production of the constituent parts of the bearing assembly by way of 3D printing, and/or to carry out a simulation of the method of operation of the bearing assembly based on the data stored in the data packets with regard to design, material properties and physical interactions. The data agglomerate can represent, in the manner of what is known as a "digital twin", a virtual embodiment of an apparatus which is configured in the present case as the bearing assembly, which virtual embodiment makes a virtual examination in the form of a simulation or a real objectification with the aid of an additive manufacturing method possible. Here, the data packets can comprise data about the design of the different components of the apparatus, as are required for additive manufacturing by way of 3D printing. The data packets can preferably additionally comprise data about the material properties of the different components of the apparatus and/or the physical interactions between the different components of the apparatus, in order to simulate their method of operation in a simulated environment which is suitable to this end, in a computer-based manner, for example in order to examine mechanical properties such as deformation, force loading, torque loading, in particular on the basis of a finite element analysis, and/or to examine heat generation and/or heat distribution of the different components of the apparatus. Here, in particular, each data packet can model a separately configured constituent part of the respective associated apparatus, with the result that the individual constituent parts can be assembled easily in an actual and/or virtual manner in their relative position and/or relative movability and/or their force and/or heat transmission, in order to realize the interactions which are essential to the invention. This makes an inexpensive production of prototypes and/or computer-based simulations possible, in order to study the method of operation of the apparatus, to identify problems in the specific application, and to find improvements. A mechanically and electrically more operationally reliable leadthrough of the pitch tube through the transmission of a wind power plant is made possible in an inexpensive and simple manner with the aid of the bearing cartridge which is fastened in an electrically insulating manner via the insulation element, which can be checked easily and inexpensively with the aid of the data agglomerate.

BRIEF DESCRIPTION OF THE DRAWING

In the following text, the invention will be explained by way of example using preferred exemplary embodiments with reference to the appended drawings, it being possible for the features which are shown in the following text to represent an aspect of the invention both in each case individually and in combination. In the drawings.

DETAILED DESCRIPTION OF PREFERRED EMBODIMENTS

Figure 1:
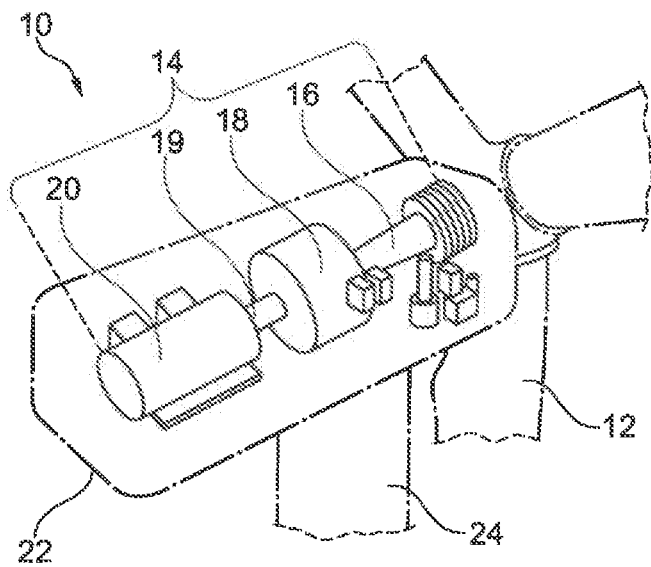
FIG. 1 shows a diagrammatic perspective view of a wind power plant.

The wind power plant 10 which is shown in FIG. 1 can be used to generate electrical energy from wind power. To this end, the wind power plant 10 has a rotor 12 which can be set in rotation by way of wind in a wind power-driven manner. The rotor 12 is coupled to a drive train 14. To this end, the rotor 12 is connected to a rotor shaft 16 which is coupled within the drive train 14 to a transmission 18, in order to convert the torque which is introduced via the rotor 12 and the rotor shaft 16. The torque which is converted in the transmission 18 is fed via a motor shaft 19 to an electric machine which is operated in the generator mode and can configure a generator 20. The electrical energy which is generated by the electric machine can be fed to a rechargeable battery and/or a power grid. In the exemplary embodiment which is shown, the drive train 14 is accommodated completely in a nacelle 22 which is attached to an upper free end of a stand-alone tower 24. The rotor 12, the transmission 18 and the generator 20 can be arranged coaxially with respect to one another and can preferably run in an angled manner with respect to the horizontal. A pitch tube 26 can run from the generator 20 through the transmission 18 as far as the rotor 12, in order for it to be possible for electrical lines to be routed to a blade angle setting control means (pitch control means) of the rotor.

Figure 2:
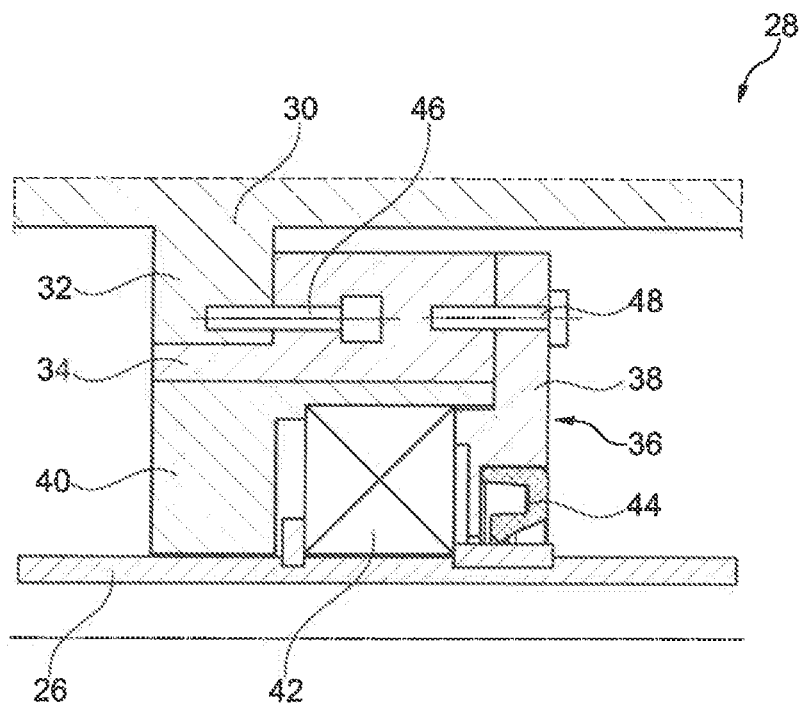
FIG. 2 shows a diagrammatic sectional view of a first embodiment of the bearing assembly for the wind power plant from FIG. 1.

As is shown in FIG. 2, the pitch tube 26 can be mounted in a, for example, generator-side and/or rotor-side bearing assembly 28 in or in the vicinity of the transmission 18. The bearing assembly 28 has a transmission shaft 30, which can be, for example, the rotor shaft 16 which acts as a transmission input shaft or the motor shaft 19 which acts as a transmission output shaft. The transmission shaft 30 is configured as a hollow shaft, from the axial ends of which the pitch tube 26 can protrude. In the exemplary embodiment which is shown, this is the transmission shaft 30 which has an, in particular, single-piece fastening flange 32, to which a bearing cartridge 36 which mounts the relatively rotatable pitch tube 26 is fastened indirectly via an insulation element 34. As an alternative, the fastening flange 32 can be configured by the pitch tube 26, and the bearing cartridge 36 can mount the transmission shaft 30 which is relatively rotatable in this case. The bearing cartridge 36 has a first cartridge part 38 and a second cartridge part 40 which is connected to the first cartridge part 38, between which cartridge parts a bearing 42, in particular an anti-friction bearing, is received in a defined axial position. On one axial side, the first cartridge part 38 can seal the bearing 42 which is lubricated, in particular, with a lubricant, a sealing element which is configured as a radial shaft sealing ring 44 configuring a contact seal to this end in the exemplary embodiment which is shown. On the other axial side of the bearing 42, the second cartridge part 40 can configure a contactless gap seal with the pitch tube 26.

In order that electrical currents which come from the generator and are induced, for example, by way of induction cannot pass into the transmission 18 or into the transmission shaft 30 as a consequence of a voltage flashover, there is sufficient electrical insulation by way of the insulation element 34. To this end, the insulation element 34 is fastened to the fastening flange 32 with the aid of at least one first fastening element 46, while the insulation element 36 is fastened to the bearing cartridge 36 with the aid of at least one second fastening element 48. The first fastening element 46 and/or the second fastening element 46 can be configured, in particular, as a screw which preferably interacts with an associated internal thread. The first fastening element 46 and/or the second fastening element 46 are/is oriented, in particular, in the axial direction. In particular, a plurality of first fastening elements 46 are provided which are preferably distributed uniformly in the circumferential direction and/or are arranged on a common radius. In particular, a plurality of second fastening elements 48 are provided which are preferably distributed uniformly in the circumferential direction and/or are arranged on a common radius. The first fastening element 46 and the second fastening element 48 are spaced apart from one another to such an extent that a sufficiently large amount of material of the insulation element 36 remains at the narrowest location between the first fastening element 46 and the second fastening element 48, in order to ensure the desired electrical insulation.

Figure 3:
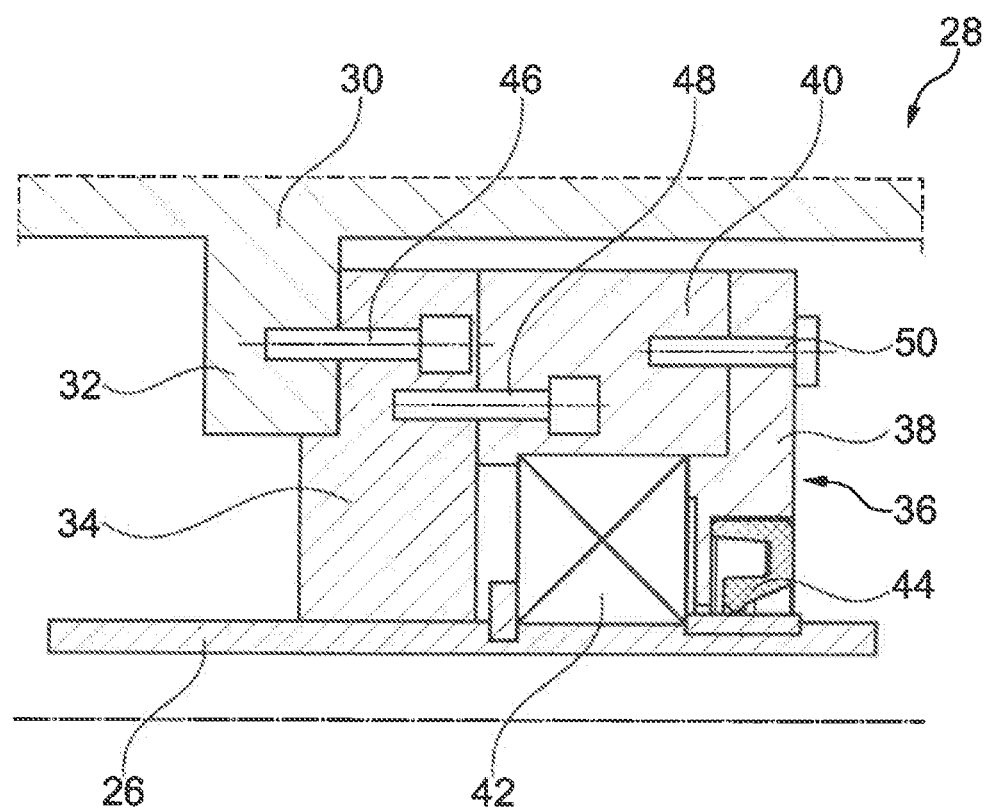
FIG. 3 shows a diagrammatic sectional view of a second embodiment of a bearing assembly for the wind power plant from FIG. 1.

In the case of that embodiment of the bearing assembly 28 which is shown in FIG. 3, in contrast to that embodiment of the bearing assembly 28 which is shown in FIG. 2, a gap seal is configured by way of the insulation element 36 on the pitch tube 26 on that axial side of the bearing 42 which points away from the first cartridge part 38. In addition, a third fastening element 50 can be seen which connects the first cartridge part 38 to the second cartridge part 40. The third fastening element 50 can be configured, in particular, as a screw which preferably interacts with an associated internal thread. The third fastening element 50 is oriented, in particular, in the axial direction. In particular, a plurality of third fastening elements 50 are provided which are preferably distributed uniformly in the circumferential direction and/or are arranged on a common radius. It is also the case in that embodiment of the bearing assembly 28 which is shown in FIG. 3 that, as an alternative, the fastening flange 32 can be configured by the pitch tube 26 and the bearing cartridge 36 can mount the transmission shaft 30 which is relatively rotatable in this case.

What is claimed is:

1. A bearing assembly for a pitch tube of a wind power plant, the bearing assembly comprising:
   a transmission shaft;
   a bearing cartridge designed to mount and seal the pitch tube with respect to the transmission shaft;
   a fastening flange forming part of the transmission shaft or the pitch tube for fastening the bearing cartridge in a non-rotational manner;
   an insulation element designed to electrically insulate the pitch tube with respect to the transmission shaft;
   a first fastening element designed to fasten the insulation element to the fastening flange; and
   a second fastening element designed to fasten the insulation element to the bearing cartridge.

2. The bearing assembly of claim 1, wherein the first fastening element is spaced apart from the second fastening element and from the bearing cartridge to such an extent that the first fastening element is insulated electrically with respect to the pitch tube by the insulation element, and wherein the second fastening element is spaced apart from the fastening flange to such an extent that the second fastening element is insulated electrically with respect to the transmission shaft by the insulation element.

3. The bearing assembly of claim 1, wherein the first fastening element and the second fastening element are spaced apart from one another in an axial direction in such a way that, as viewed in a tangential direction, a non-overlapping offset is established between the first fastening element and the second fastening element.

4. The bearing assembly of claim 1, wherein the first fastening element and the second fastening element are spaced apart from one another in a radial direction in such a way that, as viewed in an axial direction, a non-overlapping offset is established between the first fastening element and the second fastening element.

5. The bearing assembly of claim 1, wherein the first fastening element and the second fastening element are spaced apart from one another in a circumferential direction in such a way that, as viewed in a radial direction, a non-overlapping offset is established between the first fastening element and the second fastening element.

6. The bearing assembly of claim 1, further comprising a bearing, said bearing cartridge comprising a first cartridge part designed to support the bearing in a first axial direction, and a second cartridge part connected to the first cartridge part and designed to support the bearing in a second axial direction which is opposed to the first axial direction, said first cartridge part comprising a seal, a gap seal and/or a labyrinth seal, wherein the insulation element bears flatly at least against the second cartridge part.

7. The bearing assembly of claim 1, wherein the insulation element is designed to form a contactless seal, with respect to a shell surface which is rotatable relative to the bearing cartridge.

8. The bearing assembly of claim 7, wherein the insulation element seals an axial side of a bearing of the bearing cartridge.

9. The bearing assembly of claim 1, wherein the bearing cartridge is designed to support a radial force between the pitch tube and the transmission shaft.

10. The bearing assembly of claim 1, wherein the first fastening element and the second fastening element are oriented in an axial direction and are covered completely, as viewed in a radial direction, by the pitch tube and/or by the transmission shaft.

11. The bearing assembly of claim 1, further comprising lubricating grease and/or lubricating oil for lubricating a bearing of the bearing cartridge.

12. The bearing assembly of claim 1, wherein the pitch tube, the bearing cartridge, the fastening flange and the transmission shaft are produced from an electrically conductive material.

13. A drive train for a wind power plant, the drive train comprising:
a rotor shaft connectable to a rotor of the wind power plant;
an electric machine designed to operate in a generator mode and comprising a motor shaft;
a transmission designed to connect the rotor shaft to the motor shaft in a torque-transmitting manner for conversion of a torque and a rotational speed;
a pitch tube designed to penetrate the transmission in an axial direction; and
a bearing assembly designed to support a pitch tube of the wind turbine in the transmission in an electrically insulated manner, said bearing assembly comprising a transmission shaft, a bearing cartridge designed to mount and seal the pitch tube with respect to the transmission shaft, a fastening flange forming part of the transmission shaft or the pitch tube for fastening the bearing cartridge in a non-rotational manner, an insulation element designed to electrically insulate the pitch tube with respect to the transmission shaft, a first fastening element designed to fasten the insulation element to the fastening flange, and a second fastening element designed to fasten the insulation element to the bearing cartridge.

14. A wind power plant for generating electrical power from wind energy, the wind power plant comprising:
a rotor for providing a torque from the wind energy;
a transmission coupled to the rotor for conversion of the torque;
a generator for generating electrical power from the torque which is introduced by the transmission; and
a pitch tube leading from the generator through the transmission as far as the rotor, and
a bearing assembly designed to support the pitch tube in the transmission in an electrically insulated manner, said bearing assembly comprising a transmission shaft, a bearing cartridge designed to mount and seal the pitch tube with respect to the transmission shaft, a fastening flange forming part of the transmission shaft or the pitch tube for fastening the bearing cartridge in a non-rotational manner, an insulation element designed to electrically insulate the pitch tube with respect to the transmission shaft a first fastening element designed to fasten the insulation element to the fastening flange, and a second fastening element designed to fasten the insulation element to the bearing cartridge,
wherein the rotor, the transmission and the generator are arranged coaxially with respect to one another.

15. The bearing assembly of claim 6, wherein the bearing is an anti-friction bearing.

16. The bearing assembly of claim 6, wherein the seal is a radial shaft sealing ring, a gap seal or a labyrinth seal.

17. The bearing assembly of claim 7, wherein the contactless seal is a gap seal or a labyrinth seal.

18. The bearing assembly of claim 12, wherein the electrically conductive material is steel.

* * * * *